US008220935B2

(12) United States Patent
Huang et al.

(10) Patent No.: US 8,220,935 B2
(45) Date of Patent: Jul. 17, 2012

(54) ILLUMINATION SYSTEM AND PROJECTION APPARATUS

(75) Inventors: Bo-Cheng Huang, Hsinchu (TW); S-Wei Chen, Hsinchu (TW); Chu-Ming Cheng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 520 days.

(21) Appl. No.: 12/604,152

(22) Filed: Oct. 22, 2009

(65) Prior Publication Data

US 2010/0128227 A1 May 27, 2010

(30) Foreign Application Priority Data

Nov. 21, 2008 (TW) .............................. 97145218 A

(51) Int. Cl.
*G03B 21/00* (2006.01)
*G03B 27/14* (2006.01)

(52) U.S. Cl. .......................................... 353/33; 359/634
(58) Field of Classification Search .................... 353/20, 353/31, 33, 34, 37, 81, 84, 94, 98, 102; 359/634, 359/40, 48, 49, 63, 64; 348/750, 766, 776–780, 348/810

See application file for complete search history.

(56) References Cited

U.S. PATENT DOCUMENTS

| 5,738,429 | A | 4/1998 | Tagawa et al. |
| 6,869,189 | B2 | 3/2005 | Kim et al. |
| 6,898,020 | B2 | 5/2005 | Ouchi |
| 6,910,777 | B2 | 6/2005 | Ito |
| 6,987,546 | B2 | 1/2006 | Ouchi et al. |
| 7,300,177 | B2 | 11/2007 | Conner |
| 2010/0045938 | A1* | 2/2010 | Lin et al. .................. 353/33 |

FOREIGN PATENT DOCUMENTS

| CN | 1411567 | 4/2003 |
| CN | 1628266 | 6/2005 |
| CN | 101169576 | 4/2008 |
| TW | 364064 | 7/1999 |
| TW | I231613 | 4/2005 |
| TW | I236568 | 7/2005 |
| TW | 200743821 | 12/2007 |

OTHER PUBLICATIONS

Chinese First Examination Report of China Application No. 200810184667.6, dated Aug. 30, 2010.

* cited by examiner

*Primary Examiner* — Georgia Y Epps
*Assistant Examiner* — Don Williams
(74) *Attorney, Agent, or Firm* — J.C. Patents

(57) ABSTRACT

An illumination system including a first light emitting chip, a chip package, a first dichroic film, and a second dichroic film is provided. The first light emitting chip emits a first light beam. The chip package includes a second light emitting chip and a third light emitting chip. The second light emitting chip emits a second light beam. The third light emitting chip emits a third light beam. The colors of the first, second, and third light beams are different from each other. The first dichroic film is disposed in the transmission paths of the first and second light beams. The second dichroic film is disposed in the transmission paths of the first, second, and third light beams. The first and second dichroic films are not parallel to and do not intersect each other. Besides, a projection apparatus employing the illumination system and another projection apparatus are provided.

19 Claims, 9 Drawing Sheets

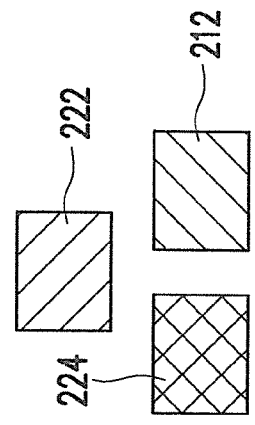
FIG. 7A
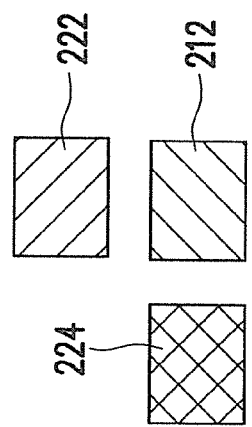
FIG. 7B
FIG. 7C
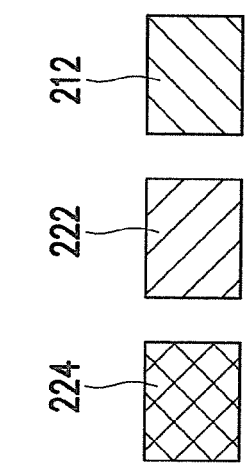
FIG. 7D
FIG. 7E
FIG. 7F

ILLUMINATION SYSTEM AND PROJECTION APPARATUS

CROSS-REFERENCE TO RELATED APPLICATION

This application claims the priority benefit of Taiwan application serial no. 97145218, filed Nov. 21, 2008. The entirety of the above-mentioned patent application is hereby incorporated by reference herein and made a part of specification.

BACKGROUND OF THE INVENTION

1. Field of the Invention

The invention generally relates to an illumination system and a projection apparatus, and more particularly, to an illumination system and a projection apparatus with higher light utilization efficiency.

2. Description of Related Art

Along with the progress of display technology, in terms of the light source employed by a projection apparatus, two kinds thereof have been launched. One kind of the projection apparatuses employs a ultra high pressure lamp (UHP lamp) emitting white light in association with a color wheel to sequentially generate red light, green light, and blue light, which makes the projection apparatus provide colorful image frames. The other kind of the projection apparatuses developed in recent years employs red light emitting diodes (LEDs), green LEDs, and blue LEDs as the light source thereof.

In a projection apparatus where red LEDs, green LEDs, and blue LEDs serve as the light source thereof, usually an X-mirror is used for combining light. For example, an X-mirror includes a red dichroic mirror and a blue dichroic mirror intersecting each other, so that a red light beam emitted from the red LEDs is reflected by the red dichroic mirror, a blue light beam emitted from the blue LEDs is reflected by the blue dichroic mirror, and a green light beam emitted from the green LEDs passes through the red dichroic mirror and the blue dichroic mirror. The X-mirror has different actions on the light beams of different colors, so that the red light beam, the green light beam, and the blue light beam respectively having different transmission directions are guided to a same direction. After the above-mentioned red light beam, green light beam, and blue light beam arrive at a digital micromirror device (DMD) in the projection apparatus and are acted by the DMD, desired color image frames are formed.

It should be noted that in an X-mirror, since a region where the red dichroic mirror and the blue dichroic mirror are cemented by each other (i.e., an intersecting region) is unable to normally guide the red light beam, the green light beam, and the blue light beam, so that a light loss is produced. In addition, when the light source is altered from the traditional UHP lamp to the LEDs, with respect to the sectional areas of the light beams emitted by the LEDs, the area of the above-mentioned cemented region gets larger to cause a light loss with a greater proportion. Besides, in a projection apparatus adopting an X-mirror, the red light beam, the green light beam, and the blue light beam are required to be incident upon the X-mirror from three different directions, which results in a low space utilization ratio for the components in the projection apparatus and in a bulky size of the projection apparatus itself.

SUMMARY OF THE INVENTION

Accordingly, the invention is directed to an illumination system with higher light utilization efficiency and better space utilization ratio.

The invention is directed to a projection apparatus with higher light utilization efficiency and better space utilization ratio.

An embodiment of the invention provides an illumination system including a first light emitting chip, a chip package, a first dichroic film, and a second dichroic film. The first light emitting chip is capable of emitting a first light beam. The chip package includes a second light emitting chip and a third light emitting chip. The second light emitting chip is capable of emitting a second light beam, and the third light emitting chip is capable of emitting a third light beam. The colors of the first light beam, the second light beam, and the third light beam are different from each other. The first dichroic film is disposed in the transmission paths of the first light beam and the second light beam. The second dichroic film is disposed in the transmission paths of the first light beam, the second light beam, and the third light beam. The first dichroic film and the second dichroic film are not parallel to each other and do not intersect each other. The first light beam sequentially passes through the first dichroic film and the second dichroic film. The second light beam sequentially passes through the second dichroic film, is reflected by the first dichroic film, and passes through the second dichroic film. The third light beam is reflected by the second dichroic film. The first light beam, the second light beam, and the third light beam together form an illumination beam after departing from the second dichroic film.

Another embodiment of the invention provides a projection apparatus including the above-mentioned illumination system, a light valve, and a projection lens. The light valve is disposed in the transmission path of the illumination beam and capable of converting the illumination beam into an image beam. The projection lens is disposed in the transmission path of the image beam.

Yet another embodiment of the invention provides a projection apparatus including an illumination system, a light valve, and a projection lens. The illumination system includes a first light emitting chip, a second light emitting chip, a third light emitting chip, a first dichroic film, a second dichroic film, a third dichroic film, and a light uniforming device. The first light emitting chip is capable of emitting a first light beam. The second light emitting chip is capable of emitting a second light beam. The third light emitting chip is capable of emitting a third light beam. The colors of the first light beam, the second light beam, and the third light beam are different from each other. At least two of the first light emitting chip, the second light emitting chip, and third light emitting chip are contained in a chip package. The first dichroic film is disposed in the transmission paths of the first light beam, the second light beam, and the third light beam. The second dichroic film is disposed in the transmission paths of the second light beam and the third light beam. The third dichroic film is disposed in the transmission path of the third light beam. The first dichroic film, the second dichroic film, and the third dichroic film do not intersect each other. The first light beam is reflected by the first dichroic film. The second light beam sequentially passes through the first dichroic film, is reflected by the second dichroic film, and passes through the first dichroic film. The third light beam sequentially passes through the first dichroic film, passes through the second dichroic film, is reflected by the third dichroic film, passes through the second dichroic film, and passes through the first dichroic film. The first light beam, the second light beam, and the third light beam together form an illumination beam after departing from the first dichroic film. The light uniforming device is disposed in the transmission paths of the first light beam, the second light beam, and the third light beam or in the transmission path of the illumination beam. The light valve is disposed in the transmission path of the illumination beam and capable of converting the illumination beam into an image beam. The projection lens is disposed in the transmission path of the image beam.

In the illumination system of the embodiments of the invention, since the first dichroic film and the second dichroic film are used to combine light and the first dichroic film and the second dichroic film do not intersect each other, so that no intersecting region which is unable to normally guide the light is formed. In this way, the illumination system of the embodiments of the invention has higher light utilization efficiency, and accordingly, the projection apparatus using the illumination system has higher light utilization efficiency as well. In addition, in the projection apparatus of the embodiments of the invention, the first dichroic film, the second dichroic film, and the third dichroic film do not intersect each other, so that no intersecting region which is unable to normally guide the light is formed and the projection apparatus of the embodiments of the invention thereby has higher light utilization efficiency.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A is a view diagram in direction D of the first light emitting chip, the second light emitting chip, and the third light emitting chip in FIG. 6.

FIGS. 7B-7F are view diagrams in direction D of the first light emitting chip, the second light emitting chip, and the third light emitting chip in FIG. 6.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described.

The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
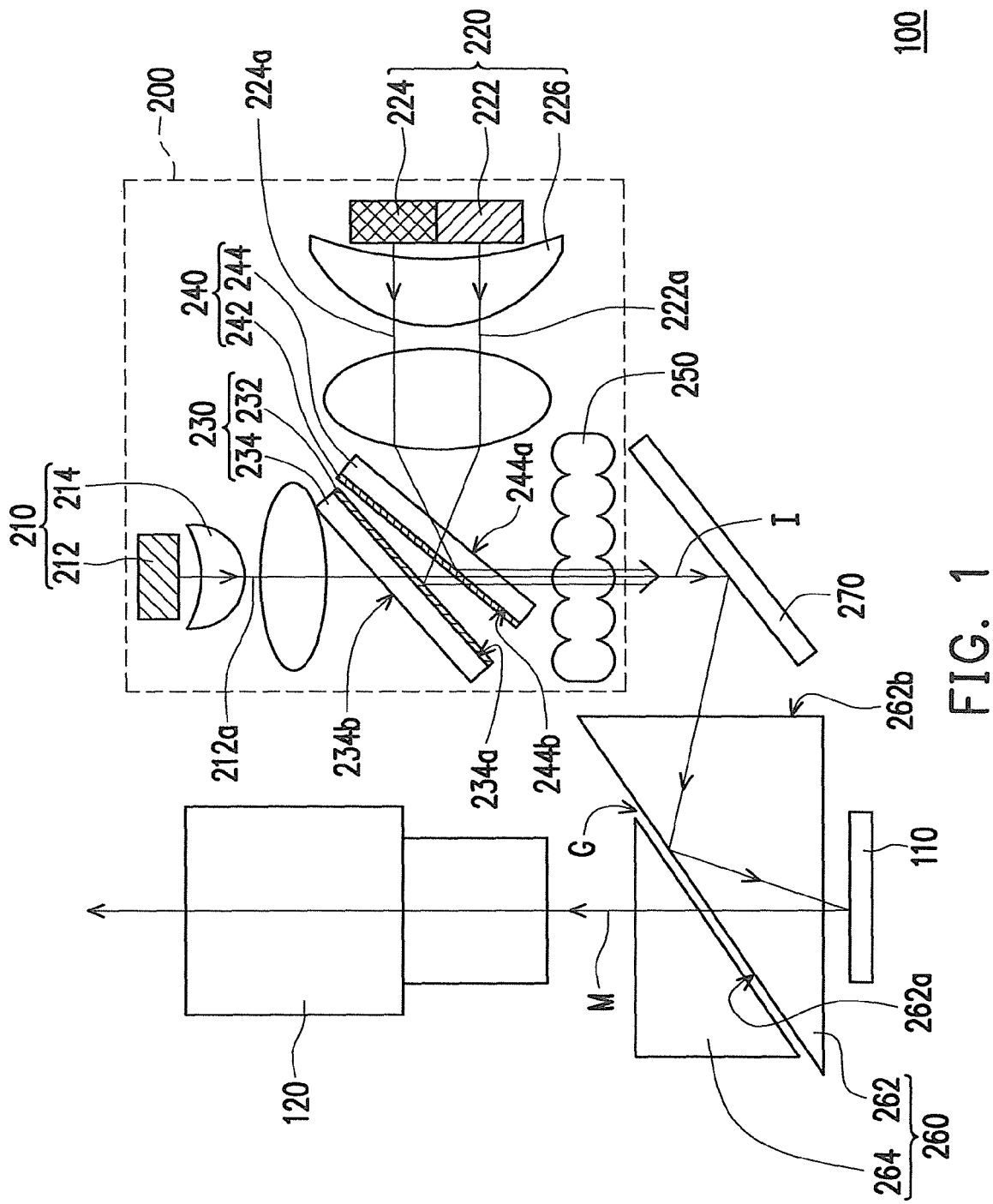
FIG. 1 is a structure diagram of a projection apparatus according to an embodiment of the invention.

FIG. 1 is a structure diagram of a projection apparatus according to an embodiment of the invention. The projection apparatus 100 of this embodiment includes an illumination system 200, a light valve 110, and a projection lens 120. The illumination system 200 includes a first light emitting chip 212, a chip package 220, a first dichroic film 232, and a second dichroic film 242. The first light emitting chip 212 is capable of emitting a first light beam 212a. In this embodiment, the first light emitting chip 212 is, for example, a light emitting diode (LED) chip. However, in other embodiments, the first light emitting chip 212 may be a laser diode chip or other appropriate light emitting chips. In addition, in this embodiment, the first light emitting chip 212 is covered by a lens 214 thereon, and the lens 214 is disposed in the transmission path of the first light beam 212a, wherein the lens 214 and the first light emitting chip 212 may be contained in a chip package 210.

The chip package 220 includes a second light emitting chip 222 and a third light emitting chip 224. The second light emitting chip 222 is capable of emitting a second light beam 222a, and the third light emitting chip 224 is capable of emitting a third light beam 224a. In this embodiment, the second light emitting chip 222 and the third light emitting chip 224 are, for example, LED chips. However, in other embodiments, the second light emitting chip 222 and the third light emitting chip 224 may be laser diode chips or other appropriate light emitting chips. In addition, in this embodiment, the chip package 220 further includes a lens 226 covering the second light emitting chip 222 and the third light emitting chip 224 and disposed in the transmission paths of the second light beam 222a and the third light beam 224a. The colors of the first light beam 212a, the second light beam 222a, and the third light beam 224a are different from each other. In this embodiment, the first light beam 212a is, for example, a green light beam; the second light beam 222a is, for example, a red light beam; the third light beam 224a is, for example, a blue light beam. In other embodiments however, the first light beam 212a, the second light beam 222a, and the third light beam 224a may be respectively light beams with other colors.

The first dichroic film 232 is disposed in the transmission paths of the first light beam 212a and the second light beam 222a. The second dichroic film 242 is disposed in the transmission paths of the first light beam 212a, the second light beam 222a, and the third light beam 224a. The first dichroic film 232 and the second dichroic film 242 are not parallel to each other and do not intersect each other. In this embodiment, the illumination system 200 further includes a first transparent substrate 234 and a second transparent substrate 244. The first transparent substrate 234 has two surfaces 234a and 234b opposite to each other, and the first dichroic film 232 is disposed on the surface 234a, so that the first transparent substrate 234 and the first dichroic film 232 form a dichroic mirror 230. The second transparent substrate 244 has two surfaces 244a and 244b opposite to each other, and the second dichroic film 242 is disposed on the surface 244b, so that the second transparent substrate 244 and the second dichroic film 242 form another dichroic mirror 240, wherein the surface 244b is not parallel to the surface 234a.

The first light beam 212a sequentially passes the first dichroic film 232 and the second dichroic film 242. The second light beam 222a sequentially passes through the second dichroic film 242, is reflected by the first dichroic film 232, and passes through the second dichroic film 242. The third light beam 224a is reflected by the second dichroic film 242. The first light beam 212a, the second light beam 222a, and the third light beam 224a together form an illumination beam I after the three light beams depart from the second dichroic film 242. In this embodiment, the first light emitting chip 212, the second light emitting chip 222, and the third light emitting chip 224 may be turned on and then off alternately so as to make the color of the illumination beam I when departing from the second dichroic film 242 changed with time. For example, the second light emitting chip 222 is turned on and then off once, then the first light emitting chip 212 is turned on and then off once, and thereafter the third light emitting chip 224 is turned on and then off once. After the above-mentioned cycle, the second light emitting chip 222, the first light emitting chip 212, and the third light emitting chip 224 repeat the cycle sequentially to be turned on and then off again and again. In this way, the color of the illumination beam I when departing the second dichroic film 242 cyclically gets changed in the order of red-green-blue, and the cycle in the order goes on again and again. However, in other embodiments, the first light emitting chip 212, the second light emitting chip 222, and the third light emitting chip 224 may emit light simultaneously to form a white illumination beam I.

The light valve 110 is disposed in the transmission path of the illumination beam I and capable of converting the illumination beam I into an image beam M. In this embodiment, the light valve 110 is a DMD; however, in other embodiments, the light valve 110 may be a liquid-crystal-on-silicon panel (LCOS panel) or a transmissive liquid crystal panel. The projection lens 120 is disposed in the transmission path of the image beam M so as to project the image beam M onto a screen (not shown) to produce image frames.

In this embodiment, the illumination system 200 further includes a light uniforming device 250 disposed in the transmission path of the illumination beam I and located between the second dichroic film 242 and the light valve 110. In more details, the light uniforming device 250 may be, for example, a lens array, so that the illumination beam I may uniformly irradiate the light valve 110 thereon.

In this embodiment, the projection apparatus 100 further includes a total internal reflection prism (TIR prism) 260 disposed in the transmission paths of the illumination beam I and the image beam M and located between the second dichroic film 242 and the light valve 110 and between the light valve 110 and the projection lens 120. In more details, the TIR prism 260 includes a first prism 262 and a second prism 264, wherein the first prism 262 keeps a gap G from the second prism 264 to form a total internal reflection surface (TIR surface) 262a on the first prism 262. The illumination beam I from the light uniforming device 250 enters the first prism 262 through an incident surface 262b of the first prism 262, and then is reflected by the TIR surface 262a onto the light valve 110. On the other hand, the image beam M from the light valve 110 sequentially passes through the first prism 262, the gap G, and the second prism 264 to arrive at the projection lens 120.

In the illumination system 200 of this embodiment, since the first dichroic film 232 and the second dichroic film 242 do not intersect each other, so that no intersecting region, as in the conventional projection apparatus, which is unable to normally guide the light is formed. In this way, the illumination system 200 of this embodiment has higher light utilization efficiency, and accordingly, the projection apparatus 100 employing the illumination system 200 has higher light utilization efficiency as well. Besides, the first dichroic film 232 and the second dichroic film 242 are not parallel to each other, so that they may respectively control the reflecting angles of the second light beam 222a and the third light beam 224a, and thereby the second light beam 222a and the third light beam 224a after departing from the second dichroic film 242 are most possibly parallel to each other. Considering the second light emitting chip 222 and the third light emitting chip 224 are contained in a same chip package 220, in comparison with the prior art where three light beams with red color, green color, and blue color in a projection apparatus are incident upon an X-mirror from three different directions, the first light beam 212a, the second light beam 222a, and the third light beam 224a in the projection apparatus 100 of this embodiment are incident upon the second dichroic film 242 from two different directions only. Therefore, the projection apparatus 100 of this embodiment is advantageous in increasing space utilization ratio and accordingly reducing the size thereof. In order to further increase the space utilization ratio, the projection apparatus 100 in this embodiment further includes a reflective mirror 270 disposed in the transmission path of the illumination beam I and located between the light uniforming device 250 and the TIR prism 260. The reflective mirror 270 enables the transmission path of the illumination beam I turning direction to further increase the space utilization ratio.

Figure 2:
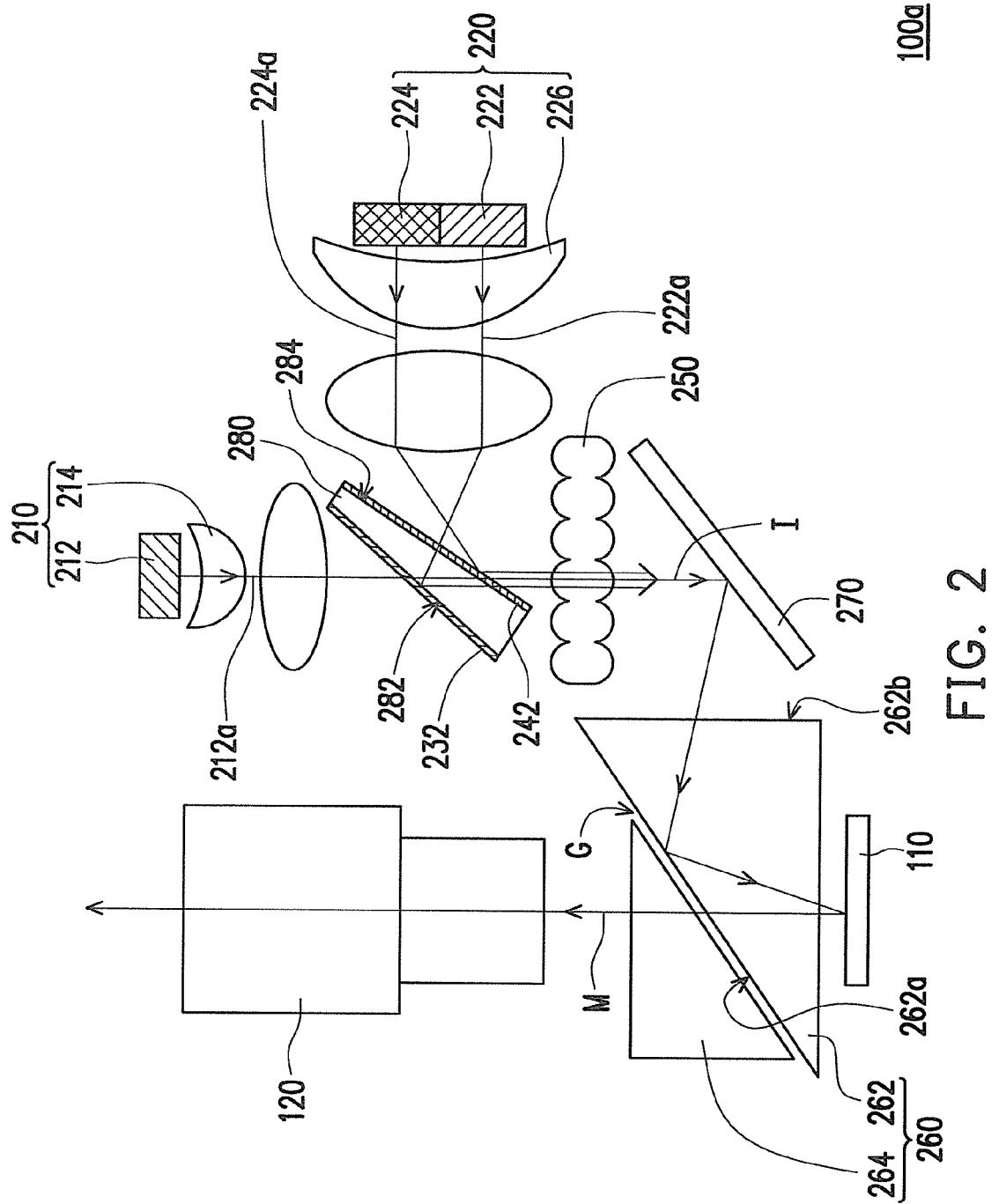
FIG. 2 is a structure diagram of a projection apparatus according to another embodiment of the invention.

FIG. 2 is a structure diagram of a projection apparatus according to another embodiment of the invention. Referring to FIG. 2, the projection apparatus 100a of this embodiment is similar to the above-mentioned projection apparatus 100 (as shown in FIG. 1) except that the projection apparatus 100a further includes a transparent substrate 280 having a first surface 282 and a second surface 284 opposite to the first surface 282. The first dichroic film 232 is disposed on the first surface 282, the second dichroic film 242 is disposed on the second surface 284, and the first surface 282 is not parallel to the second surface 284 so that the first dichroic film 232 is not parallel to the second dichroic film 242.

Figure 3:
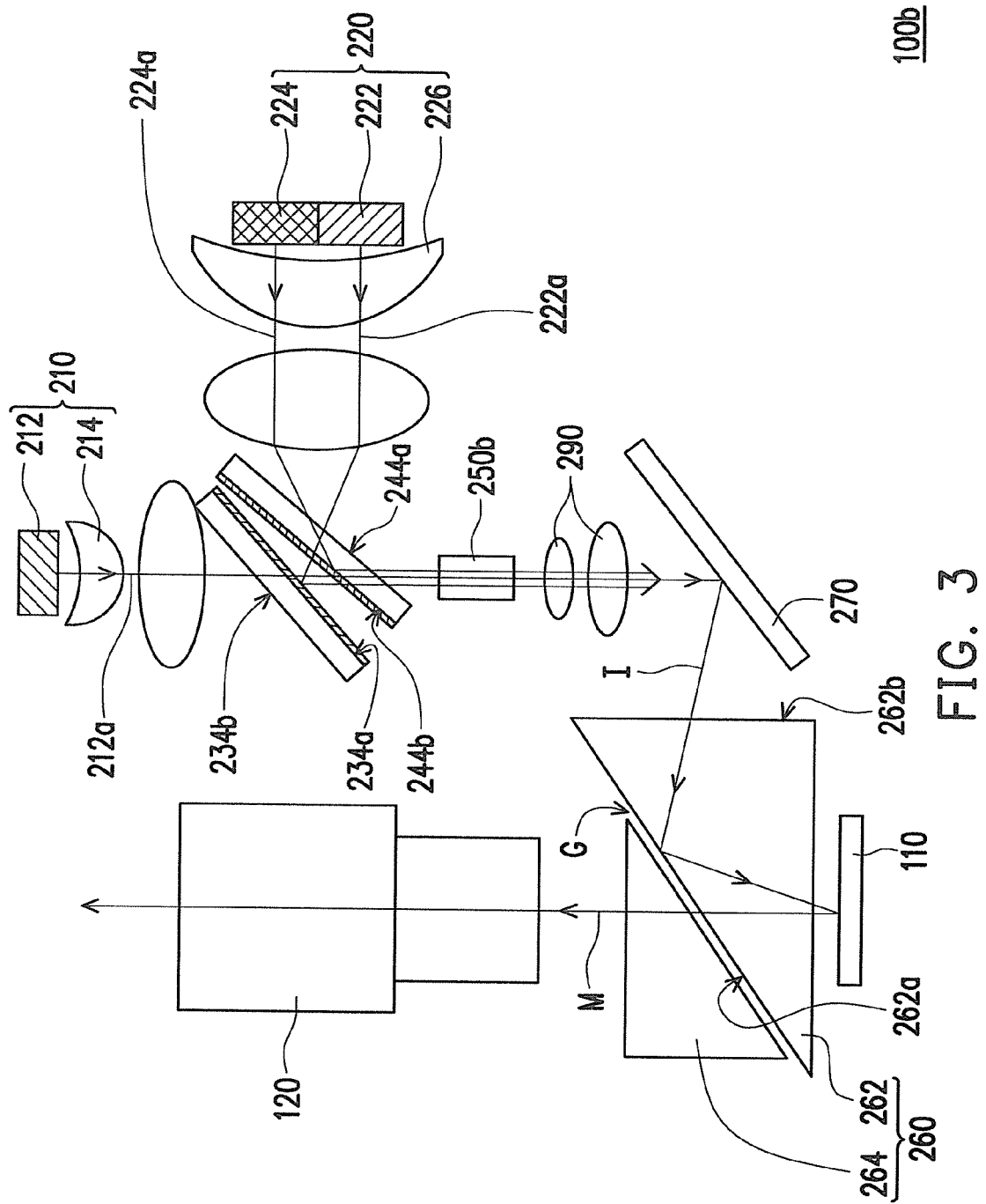
FIG. 3 is a structure diagram of a projection apparatus according to still another embodiment of the invention.

FIG. 3 is a structure diagram of a projection apparatus according to still another embodiment of the invention. Referring to FIG. 3, the projection apparatus 100b of this embodiment is similar to the above-mentioned projection apparatus 100 (as shown in FIG. 1) except that in the projection apparatus 100b of this embodiment, the light uniforming device 250b is a light integration rod (LIR). In addition, in this embodiment, the projection apparatus 100b further includes at least one lens 290 disposed in the transmission path of the illumination beam I and located between the light uniforming device 250b and the light valve 110, so that the illumination beam I from the light uniforming device 250b may be converged onto the light valve 110.

Figure 4:
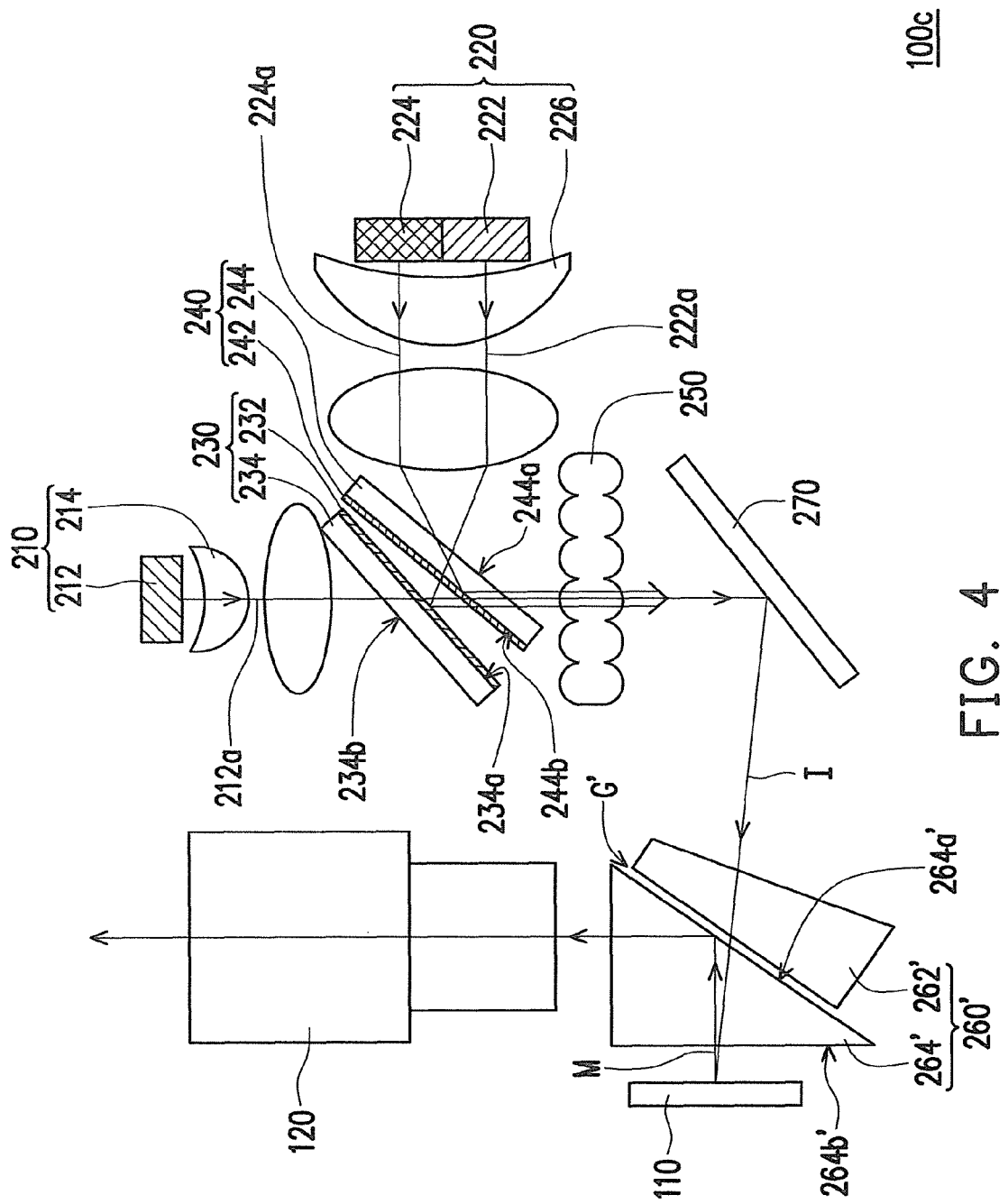
FIG. 4 is a structure diagram of a projection apparatus according to yet still another embodiment of the invention.

FIG. 4 is a structure diagram of a projection apparatus according to yet still another embodiment of the invention. Referring to FIG. 4, the projection apparatus 100c of this embodiment is similar to the above-mentioned projection apparatus 100 (as shown in FIG. 1) except that in the projection apparatus 100c of this embodiment, the above-mentioned TIR prism 260 (as shown in FIG. 1) is replaced by a TIR prism 260' in another type. The TIR prism 260' includes a first prism 262' and a second prism 264', and the first prism 262' keeps a gap G' from the second prism 264' so as to form a TIR surface 264a' on the second prism 264'. The illumination beam I from the light uniforming device 250 sequentially passes through the first prism 262', the gap G', and the second prism 264' to arrive at the light valve 110. The image beam M from the light valve 110 enters the second prism 264' through the incident surface 264b' of the second prism 264' and is then reflected by the TIR surface 264a' onto the projection lens 120.

Figure 5:
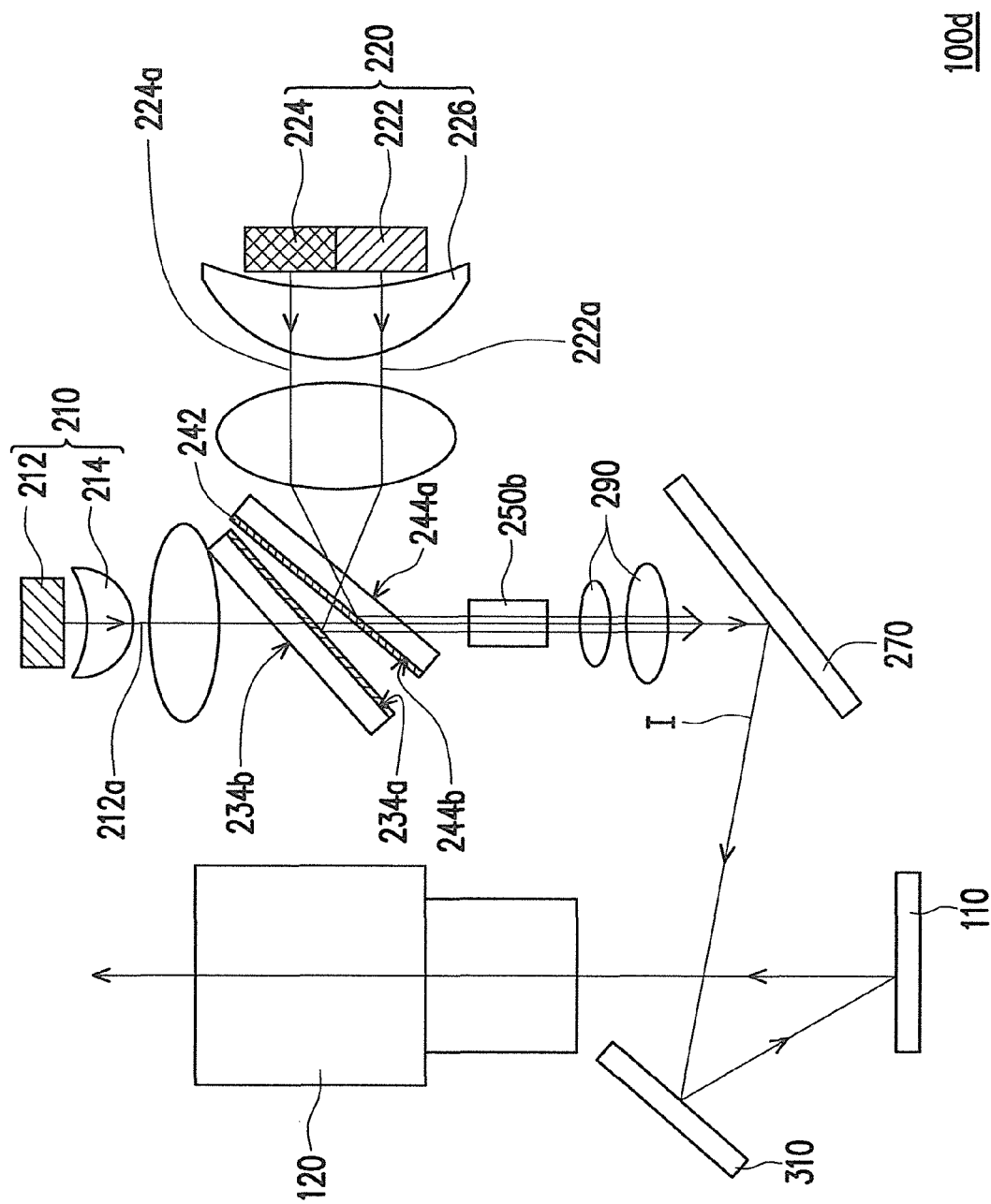
FIG. 5 is a structure diagram of a projection apparatus according to yet still another embodiment of the invention.

FIG. 5 is a structure diagram of a projection apparatus according to yet still another embodiment of the invention. Referring to FIG. 5, the projection apparatus 100d of this embodiment is similar to the above-mentioned projection apparatus 100b (as shown in FIG. 3) except that in the projection apparatus 100d of this embodiment, the above-mentioned TIR prism 260 is replaced by a reflective mirror 310. The reflective mirror 310 is disposed in the transmission path of the illumination beam I and located between the second dichroic film 242 and the light valve 110 so as to reflect the illumination beam I onto the light valve 110.

Figure 6:
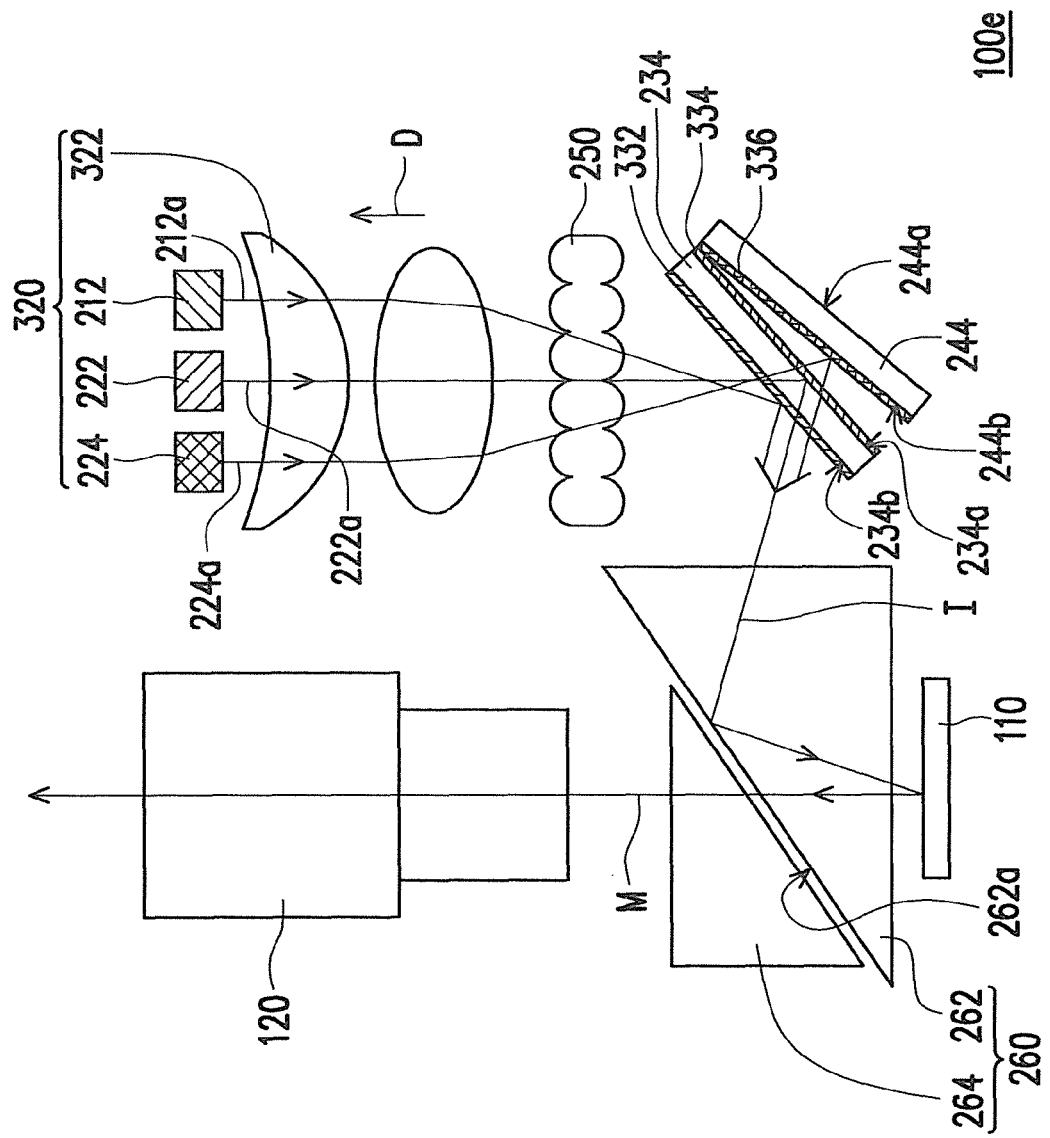
FIG. 6 is a structure diagram of a projection apparatus according to yet still another embodiment of the invention.

FIG. 6 is a structure diagram of a projection apparatus according to yet still another embodiment of the invention. Referring to FIG. 6, the projection apparatus 100e of this embodiment is partially similar to the above-mentioned projection apparatus 100 (as shown in FIG. 1) except that in the projection apparatus 100e, the first light emitting chip 212, the second light emitting chip 222, and the third light emitting chip 224 are contained in a chip package 320. In this embodiment, the chip package 320 further includes a lens 322 to cover the first light emitting chip 212, the second light emitting chip 222, and the third light emitting chip 224. The lens 322 is disposed in the transmission paths of the first light beam 212a, the second light beam 222a, and the third light beam 224a. The projection apparatus 100e includes a first dichroic film 332, a second dichroic film 334, and a third dichroic film 336. The first dichroic film 332 is disposed in the transmission paths of the first light beam 212a, the second light beam 222a, and the third light beam 224a. The second dichroic film 334 is disposed in the transmission paths of the second light beam 222a and the third light beam 224a. The third dichroic film 336 is disposed in the transmission path of the third light beam 224a. The first dichroic film 332, the second dichroic film 334, and the third dichroic film 336 do not intersect each other.

In this embodiment, at least two of the first dichroic film 332, the second dichroic film 334, and the third dichroic film 336 are not parallel to each other. For example, in this embodiment, the first dichroic film 332 is disposed on the surface 234b of the first transparent substrate 234, the second dichroic film 334 is disposed on the surface 234a of the first transparent substrate 234, the third dichroic film 336 is disposed on the surface 244b of the second transparent substrate 244, the second dichroic film 334 and the third dichroic film 336 are not parallel to each other, and the first dichroic film 332 and the third dichroic film 336 are not parallel to each other. It should be noted that the invention is not limited to the above-mentioned disposing locations and parallel relationships of the first dichroic film 332, the second dichroic film 334, and the third dichroic film 336. In other embodiments, the second dichroic film 334 and the third dichroic film 336 may be disposed on the second transparent substrate 244, and the first dichroic film 332 and the second dichroic film 334 may be not parallel to each other.

The first light beam 212a is reflected by the first dichroic film 332. The second light beam 222a sequentially passes through the first dichroic film 332, is reflected by the second dichroic film 334, and passes through the first dichroic film 332. The third light beam 224a sequentially passes through the first dichroic film 332, passes through the second dichroic film 334, is reflected by the third dichroic film 336, passes through the second dichroic film 334, and passes through the first dichroic film 332. The first light beam 212a, the second light beam 222a, and the third light beam 224a together form an illumination beam I after the three light beams depart from the first dichroic film 332. In this embodiment, the light uniforming device 250 is disposed in the transmission paths of the first light beam 212a, the second light beam 222a, and the third light beam 224a and located between the chip package 320 and the first dichroic film 332.

In the projection apparatus 100e of this embodiment, since the first dichroic film 332, the second dichroic film 334, and the third dichroic film 336 do not intersect each other, so that no intersecting region which is unable to normally guide the light is formed. In this way, the projection apparatus 100e of this embodiment has higher light utilization efficiency. Besides, the first dichroic film 332 and the third dichroic film 336 are not parallel to each other, so that they may respectively control the reflecting angles of the first light beam 212a and the third light beam 224a, and thereby the first light beam 212a and the third light beam 224a after departing from the first dichroic film 332 are most possibly parallel to each other. Considering the first light emitting chip 212, the second light emitting chip 222, and the third light emitting chip 224 are contained in a same chip package 320, in comparison with the prior art where three light beams with red color, green color, and blue color in a projection apparatus are incident upon an X-mirror from three different directions, the first light beam 212a, the second light beam 222a, and the third light beam 224a in the projection apparatus 100e of this embodiment are incident upon the first dichroic film 332 from one direction. Therefore, the projection apparatus 100e of this embodiment is advantageous in increasing space utilization ratio and accordingly reducing the size thereof.

FIG. 7A is a view diagram in direction D of the first light emitting chip, the second light emitting chip, and the third light emitting chip in FIG. 6. Referring to FIGS. 6 and 7A, in this embodiment, the first light emitting chip 212, the second light emitting chip 222, and the third light emitting chip 234 are arranged along a straight line. However, the invention neither limits the arrangement of the light emitting chips in the chip package 320, nor limits the number of the light emitting chips in the chip package 320 to three. The light emitting chips in the chip package 320 may be disposed in other ways as follows.

FIGS. 7B-7F are view diagrams in direction D of the first light emitting chip, the second light emitting chip, and the third light emitting chip in FIG. 6. Referring to FIG. 7B, the first light emitting chip 212, the second light emitting chip 222, and the third light emitting chip 234 are arranged in L-shape. Referring to FIG. 7C, the first light emitting chip 212, the second light emitting chip 222, and the third light emitting chip 234 are arranged in triangle shape. Referring to FIGS. 7D and 7E, the chip package includes four light emitting chips, i.e., two first light emitting chips 212, a second light emitting chip 222, and a third light emitting chip 224. Referring to FIG. 7F, the chip package includes six light emitting chips, i.e., three first light emitting chips 212, two second light emitting chips 222, and a third light emitting chip 224. In other embodiments, the chip package 320 (as shown in FIG. 6) may include other numbers of the light emitting chip.

Figure 8:
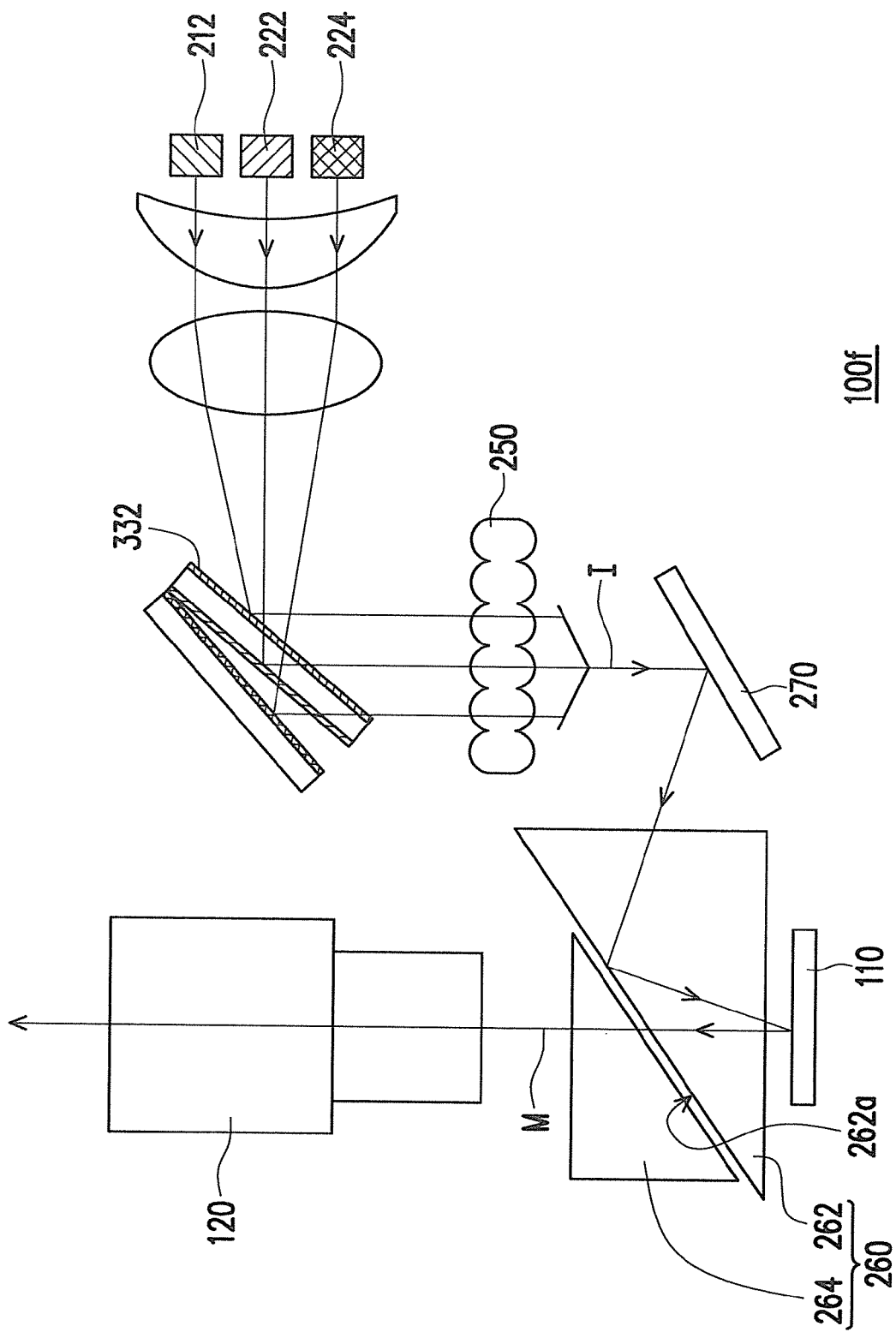
FIG. 8 is a structure diagram of a projection apparatus according to yet still another embodiment of the invention.

FIG. 8 is a structure diagram of a projection apparatus according to yet still another embodiment of the invention. Referring to FIG. 8, the projection apparatus 100f of this embodiment is similar to the above-mentioned projection apparatus 100e (as shown in FIG. 6) except that in the projection apparatus 100f of this embodiment, the light uniforming device 250 is disposed in the transmission path of the illumination beam I and located between the first dichroic film 332 and the light valve 110. In this embodiment, the projection apparatus further includes a reflective mirror 270 disposed in the transmission path of the illumination beam I and located between the light uniforming device 250 and the light valve 110.

Figure 9:
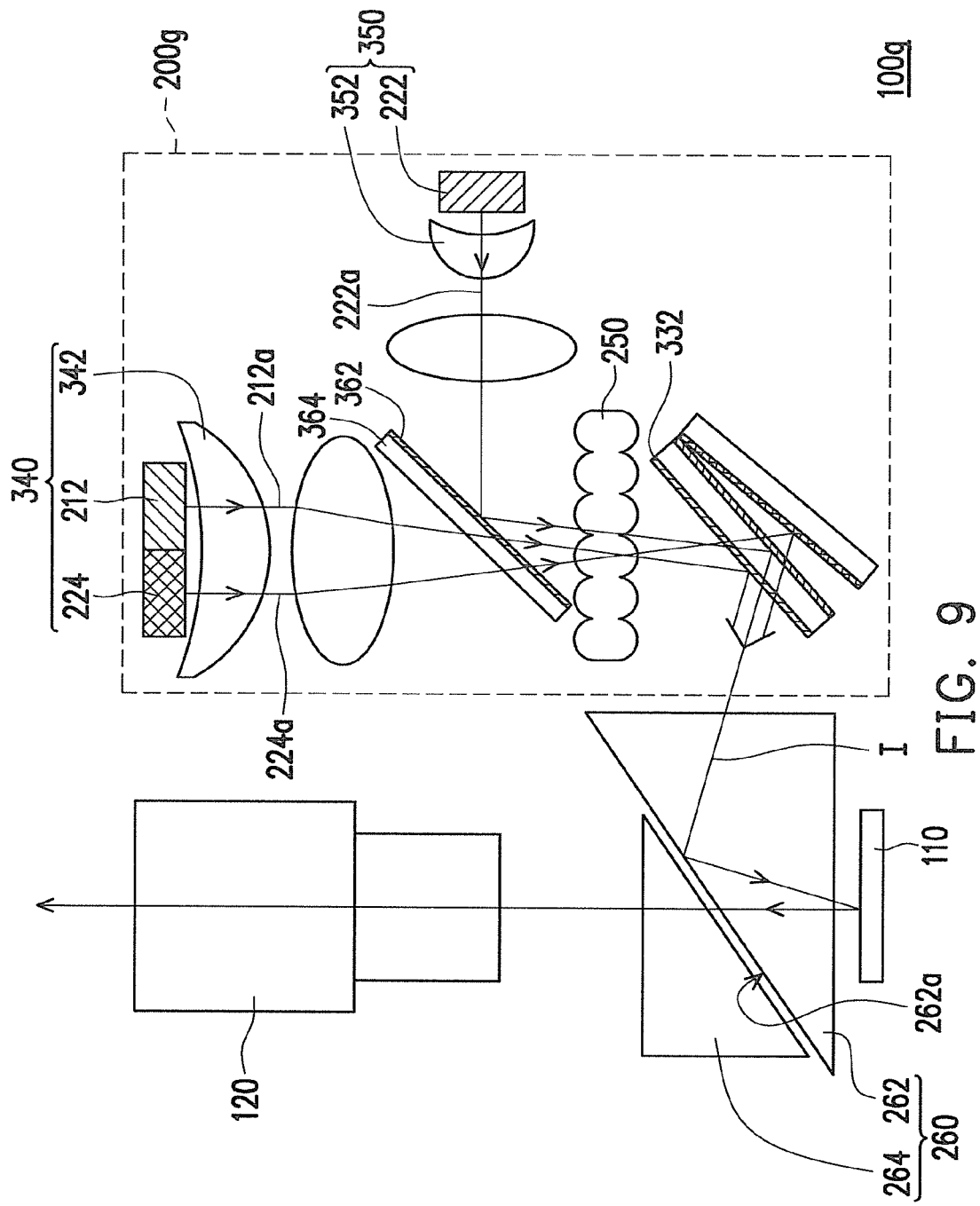
FIG. 9 is a structure diagram of a projection apparatus according to yet still another embodiment of the invention.

FIG. 9 is a structure diagram of a projection apparatus according to yet still another embodiment of the invention. Referring to FIG. 9, the projection apparatus 100g of this embodiment is similar to the above-mentioned projection apparatus 100e (as shown in FIG. 6) except that in the projection apparatus 100g of this embodiment, the first light emitting chip 212 and the third light emitting chip 224 are contained in a chip package 340. In this embodiment, the chip package 340 further includes a lens 342 to cover the first light emitting chip 212 and the third light emitting chip 224. The lens 342 is disposed in the transmission paths of the first light beam 212a and the third light beam 224a. In addition, in this embodiment, the second light emitting chip 222 is contained in another chip package 350, and the chip package 350 further includes a lens 352 to cover the second light emitting chip 222. The lens 352 is disposed in the transmission path of the second light beam 222a. The illumination system 200g of the projection apparatus 100g further includes a fourth dichroic film 362. In this embodiment, the fourth dichroic film 362 may be disposed on a transparent substrate 364. The first light beam 212a from the first light emitting chip 212 and the third light beam 224a from the third light emitting chip 224 pass through the fourth dichroic film 362 to arrive at the first dichroic film 332, while the second light beam 222a from the second light emitting chip 222 is reflected by the fourth dichroic film 362 onto the first dichroic film 332. In addition, the light uniforming device 250 is located between the fourth dichroic film 362 and the first dichroic film 332.

It should be noted that the invention does not limit that the first light emitting chip 212 and the second light emitting chip 222 are contained in the same chip package 340 and the second light emitting chip 222 is contained in another chip package 350. In fact, in other embodiments, the first light emitting chip 212 and the second light emitting chip 222 may be contained in the same chip package, and the third light emitting chip 224 may be contained in another chip package. Alternatively, the second light emitting chip 222 and the third light emitting chip 224 may be contained in the same chip package, and the first light emitting chip 212 may be contained in another chip package.

In summary, in the illumination system according to the embodiments of the invention, since the first dichroic film and the second dichroic film do not intersect each other, so that no intersecting region intersecting which is unable to normally guide the light is formed. In this way, the illumination system according to the embodiments of the invention has higher light utilization efficiency, and accordingly, the projection apparatus employing the illumination system has higher light utilization efficiency as well. Besides, in the illumination system according to the embodiments of the invention, since the second light emitting chip and the third light emitting chip are contained in the same chip package, in comparison with the prior art where three light beams with red color, green color, and blue color in a projection apparatus are incident upon an X-mirror from three different directions, the first light beam, the second light beam, and the third light beam in the projection apparatus according to the embodiments of the invention are incident upon the second dichroic film from two different directions. Therefore, the projection apparatus according to the embodiments of the invention is advantageous in increasing space utilization ratio and accordingly reducing the size thereof.

In the projection apparatus according to the embodiments of the invention, since the first dichroic film, the second dichroic film, and the third dichroic film do not intersect each other, so that no intersecting region which is unable to normally guide the light is formed. In this way, the illumination system according to the embodiments of the invention has higher light utilization efficiency. In addition, in the projection apparatus according to the embodiments of the invention, since the first light emitting chip, the second light emitting chip, and the third light emitting chip are contained in the same chip package, in comparison with the prior art where three light beams with red color, green color, and blue color in a projection apparatus are incident upon an X-mirror from three different directions, the first light beam, the second light beam, and the third light beam in the projection apparatus according to the embodiments of the invention are incident upon the first dichroic film from the same direction. Therefore, the projection apparatus according to the embodiments of the invention is advantageous in increasing space utilization ratio and accordingly reducing the size thereof.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   a first light emitting chip, capable of emitting a first light beam;
   a chip package, comprising:
      a second light emitting chip, capable of emitting a second light beam; and
      a third light emitting chip, capable of emitting a third light beam, wherein the colors of the first light beam, the second light beam, and the third light beam are different from each other;
   a first dichroic film, disposed in the transmission paths of the first light beam and the second light beam; and
   a second dichroic film, disposed in the transmission paths of the first light beam, the second light beam, and the third light beam, wherein the first dichroic film and the second dichroic film are not parallel to each other and do not intersect each other, the first light beam is capable of passing through the first dichroic film and the second dichroic film sequentially, the second light beam is capable of passing through the second dichroic film, being reflected by the first dichroic film, and passing through the second dichroic film sequentially, the third light beam is capable of being reflected by the second dichroic film, and the first light beam, the second light beam, and the third light beam together form an illumination beam after departing from the second dichroic film.

2. The illumination system as claimed in claim 1, further comprising a light uniforming device disposed in the transmission path of the illumination beam.

3. The illumination system as claimed in claim 1, wherein the chip package further comprises a lens covering the second light emitting chip and the third light emitting chip and disposed in the transmission paths of the second light beam and the third light beam.

4. The illumination system as claimed in claim 1, further comprising:
   a first transparent substrate, having a first surface, wherein the first dichroic film is disposed on the first surface; and
   a second transparent substrate, having a second surface, wherein the second dichroic film is disposed on the second surface, and the first surface is not parallel to the second surface.

5. The illumination system as claimed in claim 1, further comprising a transparent substrate having a first surface and a second surface opposite to the first surface, wherein the first dichroic film is disposed on the first surface, the second dichroic film is disposed on the second surface, and the first surface is not parallel to the second surface.

6. A projection apparatus, comprising:
   an illumination system, comprising:
      a first light emitting chip, capable of emitting a first light beam;
      a chip package, comprising:
         a second light emitting chip, capable of emitting a second light beam; and
         a third light emitting chip, capable of emitting a third light beam, wherein the colors of the first light beam, the second light beam, and the third light beam are different from each other;
      a first dichroic film, disposed in the transmission paths of the first light beam and the second light beam; and
      a second dichroic film, disposed in the transmission paths of the first light beam, the second light beam, and the third light beam, wherein the first dichroic film and the second dichroic film are not parallel to each other and do not intersect each other, the first light beam is capable of passing through the first dichroic film and the second dichroic film sequentially, the second light beam is capable of passing through the second dichroic film, being reflected by the first dichroic film, and passing through the second dichroic film sequentially, the third light beam is capable of being reflected by the second dichroic film, and the first light beam, the second light beam, and the third light beam together form an illumination beam after departing from the second dichroic film;
   a light valve, disposed in the transmission path of the illumination beam and capable of converting the illumination beam into an image beam; and
   a projection lens, disposed in the transmission path of the image beam.

7. The projection apparatus as claimed in claim 6, further comprising a total internal reflection prism disposed in the transmission paths of the illumination beam and the image beam and located between the second dichroic film and the light valve and between the light valve and the projection lens.

8. The projection apparatus as claimed in claim 6, further comprising a reflective mirror disposed in the transmission path of the illumination beam and located between the second dichroic film and the light valve.

9. The projection apparatus as claimed in claim 6, wherein the illumination system further comprises a light uniforming device disposed in the transmission path of the illumination beam and located between the second dichroic film and the light valve.

10. The projection apparatus as claimed in claim 6, wherein the chip package further comprises a lens covering the second light emitting chip and the third light emitting chip and disposed in the transmission paths of the second light beam and the third light beam.

11. The projection apparatus as claimed in claim 6, wherein the illumination system further comprises:
   a first transparent substrate, having a first surface, wherein the first dichroic film is disposed on the first surface; and
   a second transparent substrate, having a second surface, wherein the second dichroic film is disposed on the second surface, and the first surface is not parallel to the second surface.

12. The projection apparatus as claimed in claim 6, wherein the illumination system further comprises a transparent substrate having a first surface and a second surface opposite to the first surface, wherein the first dichroic film is disposed on the first surface, the second dichroic film is disposed on the second surface, and the first surface is not parallel to the second surface.

13. A projection apparatus, comprising:
   an illumination system, comprising:

a first light emitting chip, capable of emitting a first light beam;

a second light emitting chip, capable of emitting a second light beam;

a third light emitting chip, capable of emitting a third light beam, wherein the colors of the first light beam, the second light beam, and the third light beam are different from each other, and at least two of the first light emitting chip, the second light emitting chip, and the third light emitting chip are contained in a chip package;

a first dichroic film, disposed in the transmission paths of the first light beam, the second light beam, and the third light beam;

a second dichroic film, disposed in the transmission paths of the second light beam and the third light beam;

a third dichroic film, disposed in the transmission path of the third light beam, wherein the first dichroic film, the second dichroic film, and the third dichroic film do not intersect each other, the first light beam is capable of being reflected by the first dichroic film, the second light beam is capable of passing through the first dichroic film, being reflected by the second dichroic film, and passing through the first dichroic film sequentially, the third light beam is capable of passing through the first dichroic film, passing through the second dichroic film, being reflected by the third dichroic film, passing through the second dichroic film, and passing through the first dichroic film sequentially, and the first light beam, the second light beam, and the third light beam together form an illumination beam after departing from the first dichroic film; and a light uniforming device, disposed in the transmission paths of the first light beam, the second light beam, and the third light beam or disposed in the transmission path of the illumination beam;

a light valve, disposed in the transmission path of the illumination beam and capable of converting the illumination beam into an image beam; and a projection lens, disposed in the transmission path of the image beam.

14. The projection apparatus as claimed in claim 13, wherein the first light emitting chip and the third light emitting chip are contained in the chip package, the second light emitting chip is contained in another chip package, the illumination system further comprises a fourth dichroic film, the first light beam from the first light emitting chip and the third light beam from the third light emitting chip are capable of passing through the fourth dichroic film to arrive at the first dichroic film, the second light beam from the second light emitting chip is capable of being reflected to the first dichroic film by the fourth dichroic film, and the light uniforming device is located between the fourth dichroic film and the first dichroic film.

15. The projection apparatus as claimed in claim 14, further comprising a total internal reflection prism disposed in the transmission paths of the illumination beam and the image beam and located between the first dichroic film and the light valve and between the light valve and the projection lens.

16. The projection apparatus as claimed in claim 14, wherein the chip package further comprises a lens covering the first light emitting chip and the third light emitting chip and disposed in the transmission paths of the first light beam and the third light beam.

17. The projection apparatus as claimed in claim 13, wherein all of the first light emitting chip, the second light emitting chip, and the third light emitting chip are contained in the chip package, the light uniforming device is located between the chip package and the first dichroic film, the projection apparatus further comprises a total internal reflection prism disposed in the transmission paths of the illumination beam and the image beam and located between the first dichroic film and the light valve and between the light valve and the projection lens.

18. The projection apparatus as claimed in claim 17, wherein the chip package further comprises a lens covering the first light emitting chip, the second light emitting chip, and the third light emitting chip and disposed in the transmission paths of the first light beam, the second light beam, and the third light beam.

19. The projection apparatus as claimed in claim 13, wherein at least two of the first dichroic film, the second dichroic film, and the third dichroic film are not parallel to each other.

* * * * *